Figure 1:
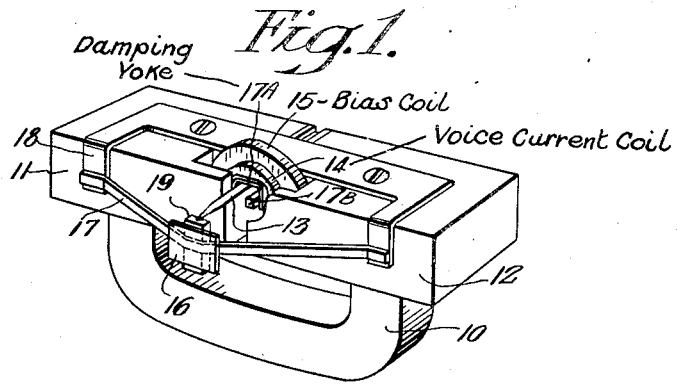

Feb. 6, 1940. G. L. DIMMICK 2,189,311
ELECTRICAL IMPULSE RESPONSIVE MEANS
Filed April 24, 1937 2 Sheets-Sheet 1

Inventor
Glenn L. Dimmick
By
Attorney

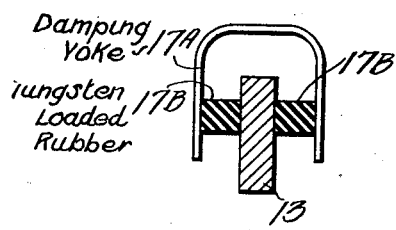
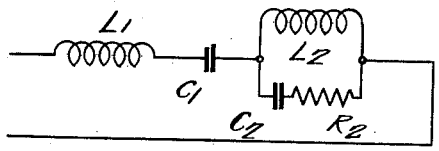
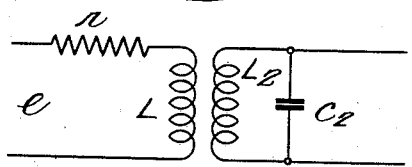
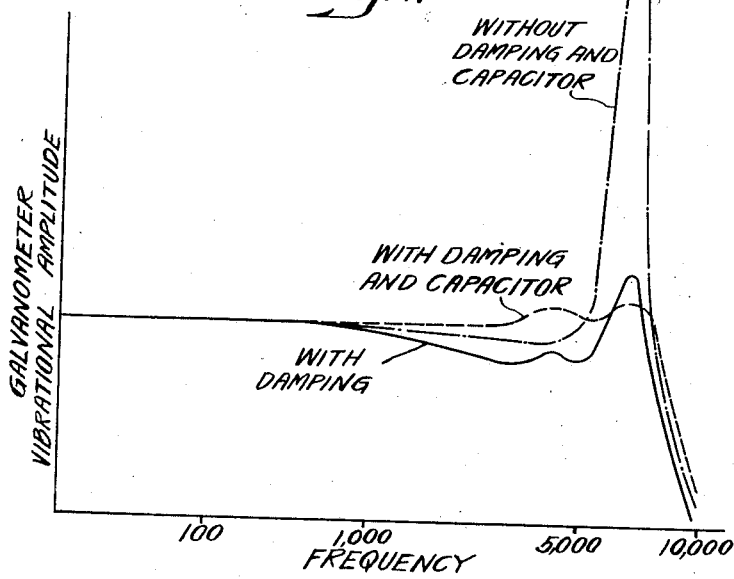

Patented Feb. 6, 1940

2,189,311

UNITED STATES PATENT OFFICE 2,189,311

ELECTRICAL IMPULSE RESPONSIVE MEANS

Glenn L. Dimmick, Erlton, N. J., assignor to Radio Corporation of America, a corporation of Delaware Application April 24, 1937, Serial No. 138,681

9 Claims. (Cl. 171—95)

This invention relates to sound recording systems wherein a light beam modulated in accordance with the impulses to be recorded is applied to a light sensitive surface such as that of a motion picture film, and has for its principal object the provision of an improved recording galvanometer which operates with more uniform response than previous recording devices of this character.

Further objects are the provision of an improved damping arrangement and improved circuit arrangement for minimizing the effect of frequency variations on the vibrational amplitude of a recording galvanometer.

While the invention is hereinafter described as applied to the recording system disclosed by a copending application of E. W. Kellogg, Serial No. 621,787, filed July 11, 1933, for "Recording of sound" and assigned to the same assignee as the present application, it will be apparent that it is equally useful in other systems of similar character.

The invention will be better understood from the following description when considered in connection with the accompanying drawings and its scope is indicated by the appended claims.

Figure 2:
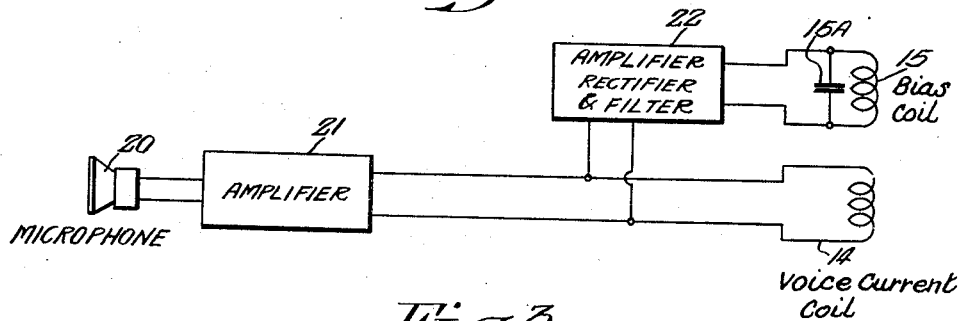
Figure 3:
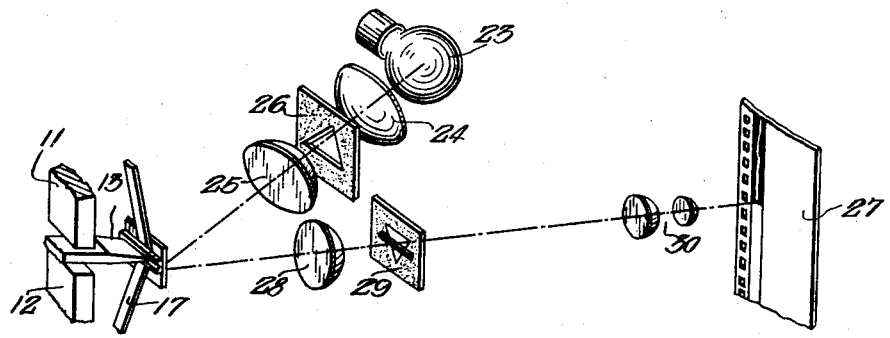

Referring to the drawings:

Figure 1 is a perspective view of a recording galvanometer to which the invention has been applied, Figure 2 is a wiring diagram of a recording system including the galvanometer of Figure 1, Figure 3 illustrates further details of the recording system of Figure 2, Figure 4 illustrates the improved damping arrangement of the invention, Figure 5 is an explanatory diagram relating to the operation of the improved damping arrangement of Figure 4, Figure 6 illustrates certain details of the galvanometer of Figure 1, and Figure 7 is a group of curves illustrating the operation of the improved galvanometer.

The galvanometer of Figure 1 includes a magnet 10 provided with pole pieces 11 and 12 and a vibratable reed 13 which is held between the pole pieces at one end, is surrounded at its center by an audio current or voice current coil 14 and by a noise elimination or bias coil 15 and is pivoted to a mirror 16 at its opposite end. The mirror 16 is mounted on a very small V block 19 which is constrained from lateral movement by a metal ribbon 17 attached to a bifurcated support 18 which is mounted on the pole pieces 11 and 12 and functions to tension the ribbon 17 so as to hold the V block 19 in contact with the knife edge at the end of the vibratable reed or armature. Within the coil 14, a metal damping yoke 17A is mounted on the reed 13 by means of two pads 17B (Fig. 4) of tungsten-loaded rubber. It will be noted that the damping yoke 17 straddles the reed or armature 13 and is separated from it by means of the pads 17B.

The operation of the galvanometer will be readily understood. As the reed is vibrated between the pole pieces 11 and 12 due to variation of the audio current in the coil 14, the mirror is rotated to and fro in accordance with these impulses. To the vibratory motion of the mirror in response to the audio current is added a more gradual movement due to the biasing coil which is supplied with a rectified current changing in value in accordance with the envelope or volume of the record of the impulses. At low frequencies, the yoke 17A moves with the armature 13 but at high frequencies it tends to stand still, thus forcing the armature to vibrate inside it and allowing the tungsten-loaded rubber pads to dampen the peaks selectively as indicated by the "with damping" curve of Fig. 7.

Rubber loaded with tungsten powder has a high damping factor and is long-lived. Other suitable materials may be similarly utilized to provide a high damping factor between the yoke and vibratable member. The electrical equivalent of the mechanical system of the improved galvanometer is shown in Fig. 5, wherein the armature and mirror mass is represented by $L_1$, the armature stiffness by $C_1$, the mass of the yoke by $L_2$, the stiffness of the pads by $C_2$, and the resistance of the pads by $R_2$. As indicated by the "with damping" curve of Fig. 7, this is a double peak system but both peaks are damped by the resistance $R_2$.

As indicated in Fig. 2, current for operating the galvanometer is derived from a microphone 20 or other suitable sound pickup device, is amplified by an amplifier 21, and is supplied from this amplifier to the audio coil 14 and also through an amplifier, rectifier and filter, indicated generally by the reference numeral 22, to the bias or noise elimination coil 15. It will, of course, be understood that a mixer or gain control and other elements commonly forming a part of the sound recorder, but not forming a part of this invention, may be provided and that the rectified and filter current is proportional to the envelope or volume of the recorded impulses. This current functions to reduce the clear part of the record to that required for proper reproduction of the sound.

Connected in shunt to the bias winding 15 is a capacitor 15A, which is provided for the purpose of improving the frequency response of the galvanometer. The effect of this capacitor is indicated by the "with damping and capacitor" curve of Fig. 7. It will be noted that the vibrational response of the galvanometer is substantially constant over a frequency range between zero and nine or ten thousand cycles. The 5000-cycle droop in the "with damping" curve is due to the inductive reactance of the modulation coil 14. By proper choice of the capacitor 15A, the 5000-cycle droop is raised about two decibels and the peak is lowered by about the same amount. If the galvanometer is not of the noise reduction type and does not include a bias winding, a coil which has an impedance much lower than that of the coil 14 is similarly associated with the coil 14 and shunted by the capacitor 15A for the purpose of improving the frequency response. The coil thus used for controlling the frequency response is identical with the coil 15 with the exception that it is not connected to the ground noise reduction circuit.

The equivalent electrical circuit is shown by Fig. 6, wherein $L_1$ is the modulation coil, $L_2$ is the bias coil, $r$ is the resistance of the last tube of the amplifier plus the resistance of the modulation coil and $C_2$ is the bias capacitor. The two coils of the galvanometer act as a transformer having a transformation ratio of about fifteen. Thus the capacitor 15A may be 225 times smaller than if its equivalent were placed across the modulation coil. It is of course apparent that the capacitor may be applied to a specially provided compensating coil instead of to the bias coil 15 in cases where the galvanometer does not involve the noise reduction feature.

As indicated by Fig. 3, light from a source 23 is applied to the mirror 16 through lenses 24 and 25 and a stop 26 provided with a triangular opening. An image of the triangular opening in stop 26 is produced in the plane of the slit 29 of the intervening lenses. Rotation of the mirror causes a raising or lowering of the triangular image or light spot, thereby illuminating more or less of the slit. The lens 30 produces on the film 27 an image of the slit 29 or so much of the slit as is illuminated. As the film 27 is moved past the optical system, while the mirror vibrates, a strip of varying width is exposed on the film. It will be observed that the record is relatively narrow where the modulation is low and increases in width at higher modulations or at greater intensity, this result being due to the noise elimination or bias coil 15 which raises the triangular light beam, with respect to the slit in the member 29, as the amplitude of the impulses increases. Under these conditions the record is automatically maintained at a width which prevents overlapping of the peaks but does not separate these peaks by a distance greater than that required for proper reproduction of the sound.

I claim as my invention:

1. An impulse-responsive device including a vibratable member, a modulation winding arranged to control the movement of said member in accordance with the impressed impulses, a relatively low impedance winding inductively coupled to said modulation winding, and a capacitor connected in shunt to said low impedance winding for controlling its frequency response.

2. An impulse-responsive device including a vibratable member, a modulation winding arranged to control the movement of said member in accordance with the impressed impulses, a relatively low impedance winding inductively coupled to said modulation winding, a capacitor connected in shunt to said low impedance winding, inertia means supported by said member, and a highly damped coupling interposed between said inertia means and said member.

3. An impulse-responsive device including a vibratable member, a modulation winding arranged to control the movement of said member in accordance with the impressed impulses, a bias winding arranged to modify said movement in accordance with the volume of said impulses, and means selectively responsive to the higher frequencies of said impulses for damping said movement.

4. An impulse-responsive device including a vibratable member, a modulation winding arranged to control the movement of said member in accordance with the impressed impulses, a bias winding arranged to modify said movement in accordance with the volume of said impulses, and means including a yoke coupled to said member through tungsten-loaded rubber pads for damping said member.

5. An impulse-responsive device including a vibratable member, a modulation winding arranged to control the movement of said member in accordance with the impressed impulses, a bias winding arranged to modify said movement in accordance with the volume of said impulses, and means interconnected with said bias winding for improving the frequency response of said modulation winding.

6. An impulse-responsive device including a vibratable member, a modulation winding arranged to control the movement of said member in accordance with the impressed impulses, a bias winding arranged to modify said movement in accordance with the volume of said impulses, and a capacitor connected in shunt to said bias winding for improving the frequency response of said modulation winding.

7. An impulse-responsive device including a vibratable member, a modulation winding arranged to control the movement of said member in accordance with the impressed impulses, a bias winding arranged to modify said movement in accordance with the volume of said impulses, and inertia means coupled to said member through a tungsten-rubber coupling for damping said member.

8. An impulse-responsive device including a vibratable member, a modulation winding arranged to control the movement of said member in accordance with the impressed impulses, a bias winding arranged to modify said movement in accordance with the volume of said impulses, inertia means supported by said member, and a highly damped coupling interposed between said inertia means and said member.

9. An impulse-responsive device including a vibratable member, a modulation winding arranged to control the movement of said member in accordance with the impressed impulses, a bias winding arranged to modify said movement in accordance with the volume of said impulses, inertia means supported by said member, and a highly damped coupling interposed between said inertia means and said member, and means interconnected with said bias winding for improving the frequency response of said modulation winding.

GLENN L. DIMMICK.